C. R. BENNETT.
SCALE AND GRAIN SAMPLER.
APPLICATION FILED NOV. 24, 1920.

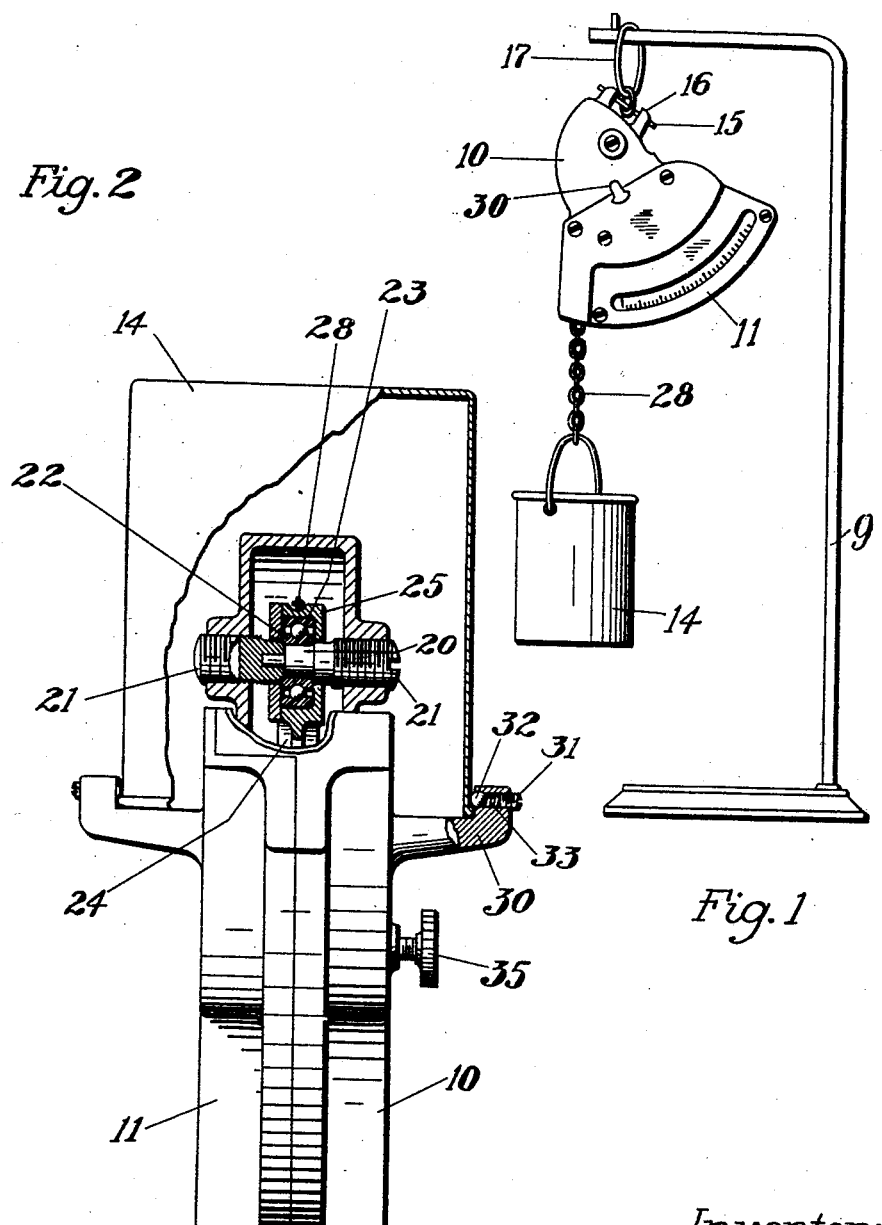

1,396,916.

Patented Nov. 15, 1921.
2 SHEETS—SHEET 2.

Inventor:
C. R. Bennett
By Southgate & Southgate,
Attorneys.

UNITED STATES PATENT OFFICE.

CONRAD R. BENNETT, OF WORCESTER, MASSACHUSETTS.

SCALE AND GRAIN-SAMPLER.

1,396,916.  Specification of Letters Patent.  Patented Nov. 15, 1921.

Application filed November 24, 1920. Serial No. 426,190.

*To all whom it may concern:*

Be it known that I, CONRAD R. BENNETT, a citizen of the United States, residing at Worcester, in the county of Worcester and State of Massachusetts, have invented a new and useful Scale and Grain-Sampler, of which the following is a specification.

Although capable of general use, this invention is particularly adapted for sampling grain. In the use of the invention for this purpose, it may be considered as an improvement over the invention disclosed in my prior Patent No. 1,222,919 issued April 17, 1917.

The principal objects of this invention are to provide means for doing away with the usual knife edge employed for the pivot in many kinds of scales and at the same time provide a minimum of friction; to provide a damping device having an improved relationship to the rest of the apparatus for reducing the vibration of the pointer; to provide a device which can be inclosed within a casing of small and convenient construction; to provide for conveniently supporting the scale pan when not in use so that the whole device may be self-contained and easily transported; and to provide for holding the pointer in fixed position when not in use. Further objects and advantages of the invention will be hereinafter described.

Reference is to be had with the accompanying drawings in which—

Figure 1 is a front elevation of a preferred embodiment of this invention;

Fig. 2 is an enlarged edge elevation partly in section and showing the scale pan gripped in position for convenient transportation.

Figure 3:
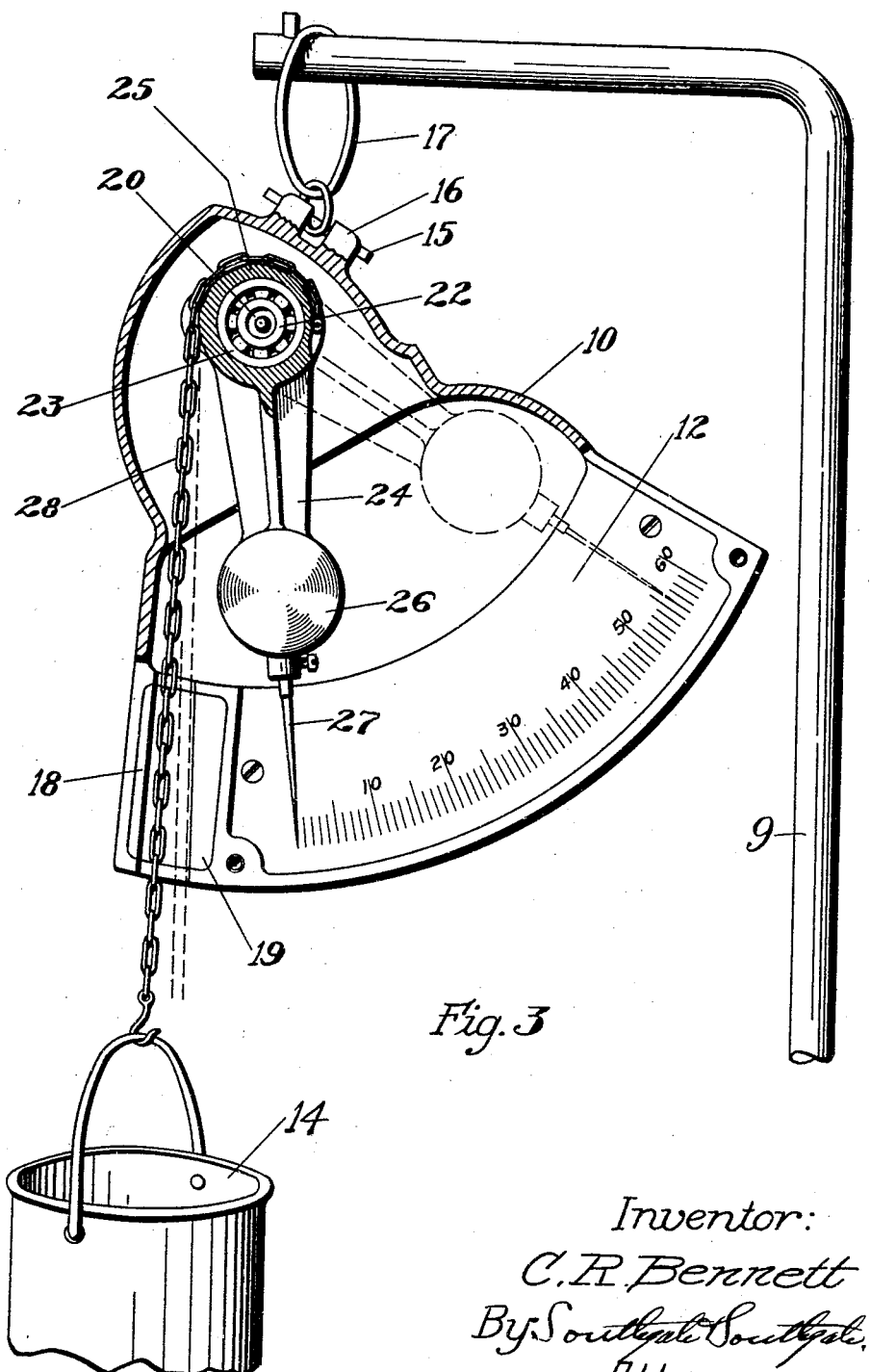
Fig. 3 is a view similar to Fig. 1 but enlarged, with the cover plate removed and with the upper parts in section on a central plane and showing two positions of the pointer arm and chain for supporting the scale pan.

I have shown the invention in a form in which it is suitable for use as a device for sampling grain but I am aware of the fact that the invention, with certain modifications, particularly in the scale itself, can be used for scales for general purposes. I have illustrated it as depending from the top of a standard 9. The frame for supporting the scale is shown in the form of a casing in two parts 10 and 11. Part 10 is shown in the form of a casting having an upper portion constituting a complete housing with a slot through the bottom and a lower portion which is mainly flat and is provided with a scale 12 thereon. This is calibrated, in the form shown in the drawings, to show pounds per bushel when used with a scale pan 14 of a definite size.

The frame or casing is intended to be supported from above by a flexible connection which I have shown in the form of a pin 15 extending across the sides between two lugs 16 integrally projecting from the frame near the top. This can be connected by a chain or the like with a ring or hook 17 which can be held in the hand or supported from a stationary standard 9 if desired.

It will be noted that the casing is of a general triangular form and that when supported, as shown, it hangs down so that one of the walls is substantially vertical. This is brought about by providing a socket 18 in each half of the casing and placing a plumb weight 19 in each of these sockets. These two sockets and these two plumb weights register with each other and the plumb weights are located adjacent to the vertical side of the casing and near the zero end of the scale.

Within the housing at the top of the casing is located a fixed stud 20. I have shown two opposite openings through the walls which are plugged by screws 21 independently removable. One of these screws passes clear through the casing and engages the other for longitudinal adjustment and constitutes a stationary stud 20 as stated. On this stationary stud is located a ball bearing inner race 22 having a series of bearing balls located around it and on these balls is swingingly mounted an outer race 23. These inner and outer races have circular recesses inside for receiving the bearing balls. An arm 24 having a hub 25, mounted about the bearing outer race, swings on the ball bearing. On this arm is located a weight 26 and beyond it a pointer 27 traveling over the scale.

The top, or the hub, of this arm is provided with a groove extending from the right hand side of the drawings, that is, the side toward the upper end of the scale, up over the top and clear around to the other side. This groove is shown in the form of a spiral cam, its distance from the center of the stud 20 gradually increasing from a point at the right hand side to the point at which it terminates on the left hand side. In the groove, at its right hand end is a pin on which the end of a chain 28 is secured. This chain or other flexible connection passes over the groove and depends from it at the point at which the bottom of the groove is at the greatest distance from the center of the stud. This chain hangs down normally practically parallel with the vertical side of the casing and through slots through the weights 19. It is provided at the bottom with a hook for receiving the scale pan 14.

The casing member 10 is provided with a chamber for the weight to move in. The other casing member is secured to the front of it by screws or the like and has an arcuate slot therethrough for use in observing the scale and pointer.

It will be noted that there are two arms 30 projecting from the two parts of the casing and at a point near the bottom of the housing. These two arms extend outward horizontally in opposite directions and each is provided with a screw 31 in its outer upturned end projecting inwardly to hold in place a ball 32, by pressure of a spring 33. The inwardly projecting surfaces of these balls are just far enough apart to grip over the beaded edge of the scale pan when turned bottom side up and supported on these arms as indicated in Fig. 2. This constitutes means for holding this scale pan and permitting of the carrying around of the whole device in a convenient manner as the parts are compactly assembled.

In order to lock the weight in fixed position when it is to be transported, a thumb screw 35 is shown in position to engage the weight when it is swung over as far to the left as possible and clamp it in fixed position.

In the use of the device, the operation for sampling grain is the same as that described in my above identified patent. For weighing other articles, the only differences required are to eliminate the scale pan and substitute some other means for holding the article or material to be weighed and to have a differently calibrated scale. It is to be observed that in whichever way it is used, the device will hang plumb from the hook above to permit the flexible connection or chain to depend vertically through the casing and permit of the application of the material or article to be weighed below the bottom of it.

A particular important feature is the use of the ball bearing for supporting the scale pointer, thus eliminating friction as well as the slight inaccuracy of the ordinary knife edge support in pendulum balances. This arrangement causes the leverage to be absolutely constant balancing on a spiral curve whatever the inclination of the pointer. By providing the flexible connection with a spiral groove of the description mentioned and an outer ball race moving above the fulcrum, an important result is secured, namely, that the pointer will be damped. In other words when weight is put on the scale the pointer will stop vibrating quickly and come to rest with very little delay, thus saving much time in cases in which the scale is used often. This is due to the balancing in spiral curves as related to the fulcrum and the line of gravity. It is caused by the outer ball race moving about the fulcrum, thus increasing the distance from the fulcrum of the bearing point of the chain, on the spiral as the pointer approaches the zero point and increasing the distance of the pendulum weight from the fulcrum at the same time.

This also permits of providing a more uniform set of graduations than would be possible in this type of scale otherwise. It will be obvious of course that this scale has to be corrected for the difference in leverage due to the varying distance of the pendulum weight from the fulcrum. This correction equalizes the width of the divisions on the scale from one end to the other. The reason for this is that with a perfectly circular or semi-circular groove the scale would need to be calibrated with increasing fineness according as the distance between the pendulum weight and fulcrum increases, when the outer ball race turns on the fulcrum and the pendulum weight approaches the zero point. The spiral pitch is made sufficient to overcome this and render it possible to calibrate the scale substantially uniformly from end to end. It is to be observed that the real fulcrum of the pointer arm is not at the center of the stud but at the top of series of balls of the ball race.

Although I have illustrated and described only a single form of the invention and described it in part as an improvement on my above patent, I am aware of the fact that the invention can be carried out in other ways and that many modifications can be made therein without departing from the scope of the invention as expressed in the claims. Therefore, I do not wish to be limited to all of the details of construction herein shown and described or to the use of the invention as a grain sampling device, but what I do claim is:—

1. In a scale, the combination of a casing of a general triangular shape having means at the top for sustaining it from above so that it will hang in a definite position by the force of gravity, a pivot stud near the top of said casing, a weighted arm pivoted on said stud, and having a circular recess in its hub, a ball bearing cage in said recess centered on said stud, a flexible connection depending from said arm and extending down through the casing to a point below it, said arm having an external groove over its top in which said flexible connection rests, said groove passing about the stud from the side on which said arm is located to the other side and gradually increasing in radial distance from the center of the stud, being farther from the center on the side on which the flexible connection depends from it, a scale pan below the casing supported by said flexible connection, said casing being provided with a scale and the arm being provided with a pointer adapted to move over the scale.

2. In a scale, the combination of a casing of a general triangular shape having means at the top for sustaining it from above so that it will hang in a definite position by the force of gravity and provided with a relatively fixed scale, a pivot stud near the top of said casing, an arm pivoted on said stud, a pointer on said arm movable over the scale, a flexible connection depending from said arm and extending vertically down through the casing near one edge to a point below it, a scale pan below the casing supported by said flexible connection, and a weight located in said casing adjacent to the flexible connection for holding the casing in position with that edge of it substantially vertical and subustantially under said stud.

3. In a scale, the combination of a frame having means at the top from which it depends from above freely so that it will hang in a definite position, a pivot stud on said frame, an arm pivoted on said stud, said frame being provided with a scale and the arm being provided with a pointer adapted to move over the scale, a flexible connection depending from said arm, a scale pan supported by said flexible connection, a weight on said pointer, and means on the frame for engaging the weight and holding it stationary to prevent vibration of the arm and pointer when not in use.

4. In a grain sampling scale of the class described, the combination of a casing provided with a scale having graduations indicating pounds per bushel, a pivot stud on said casing, a pointer pivoted thereon and movable over said scale, a chain depending from said pointer and adapted to operate it, a scale pan suspended from said chain and having a capacity for receiving a definite volume of grain, whereby upon the filling of said scale pan level full with grain the pointer will show on the scale the number of pounds per bushel, said casing being formed in two parts, one having the scale thereon, and the other having a slot in it through which the scale and the end of the pointer can be observed, one of said parts entirely inclosing the supporting pivot stud and the other being removable independently thereof.

5. In a scale of the class described, the combination of a casing provided with a scale, a pivot stud at the top of said casing, a pointer pivoted thereon and movable over said scale, a flexible connection connected with said pointer and adapted to operate it, said flexible connection extending down through the casing and depending below it, a scale pan suspended from said flexible connection, said casing being formed in two parts, one being removable independently of the other; the two parts of said casing having arms projecting oppositely therefrom and provided with means for frictionally holding and supporting the scale pan above the casing when not in use.

6. In a scale, the combination of a portable frame depending from above and having a fixed scale thereon, a pivot stud mounted on the frame, an arm pivoted about said stud, a weighted pointer carried by the arm and movable over said scale, and flexible means connected with said arm and depending therefrom for supporting an article to be weighed, said arm having a cam groove passing over the upper end of the arm and gradually increasing in distance from the center of the stud from the side on which the pointer is located to the other.

In testimony whereof I have hereunto affixed my signature.

CONRAD R. BENNETT.